W. H. HALL & F. A. DUPEA.
CANDY CUTTING MACHINE.
APPLICATION FILED DEC. 20, 1912.
1,072,848.
Patented Sept. 9, 1913.
2 SHEETS—SHEET 1.
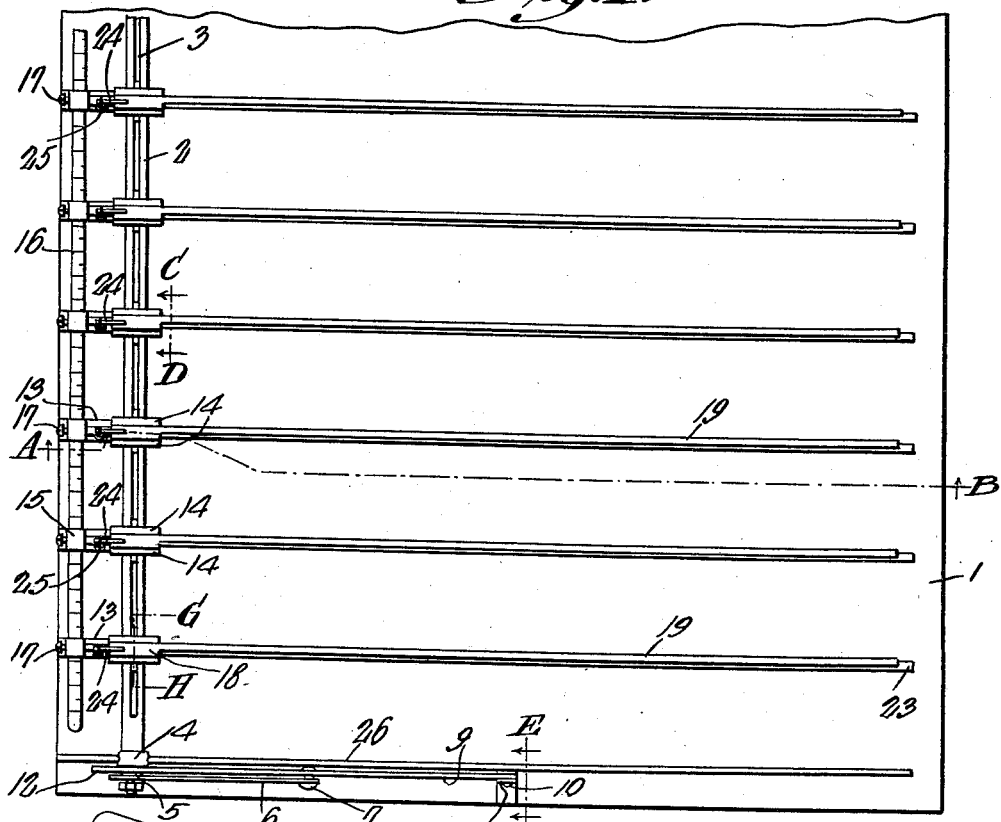
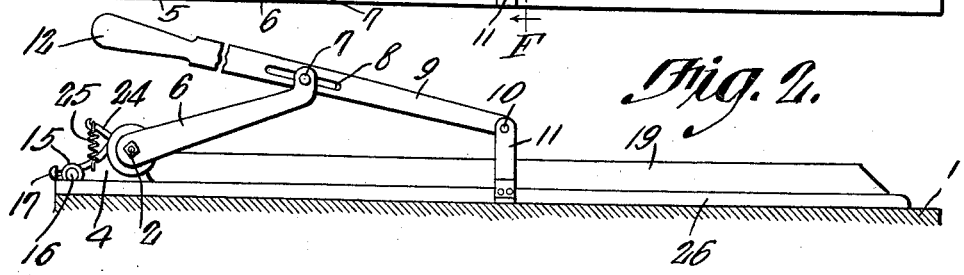
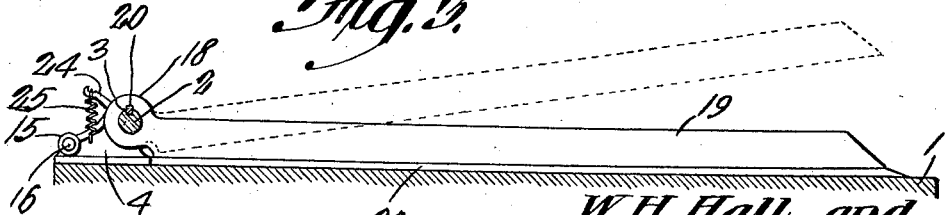
Witnesses:
W. H. Hall and
F. A. Dupea, Inventors
by C. A. Snow & Co.
Attorneys.

W. H. HALL & F. A. DUPEA.
CANDY CUTTING MACHINE.
APPLICATION FILED DEC. 20, 1912.
1,072,848.
Patented Sept. 9, 1913.
2 SHEETS—SHEET 2.
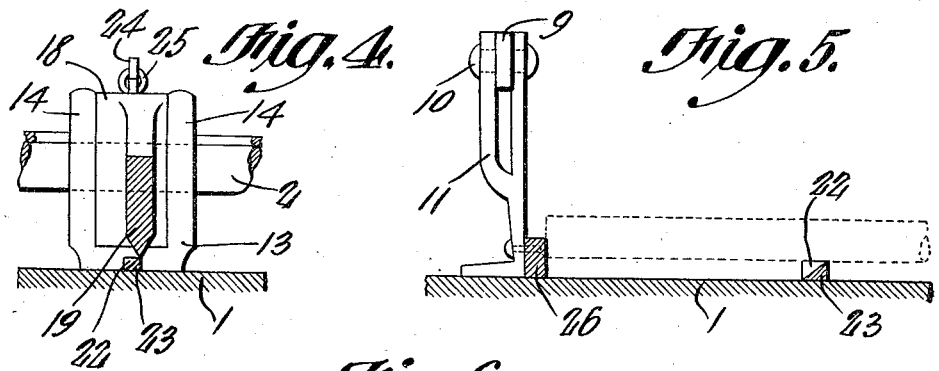
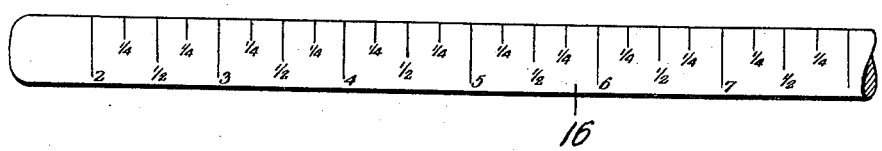
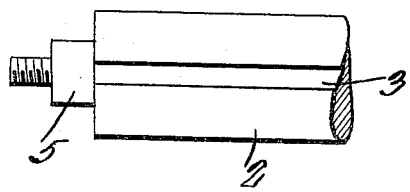
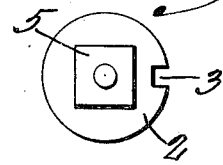
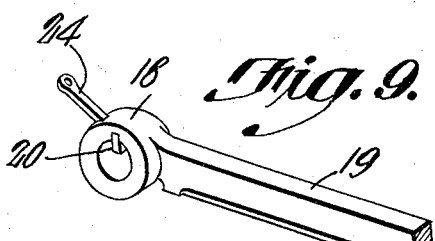
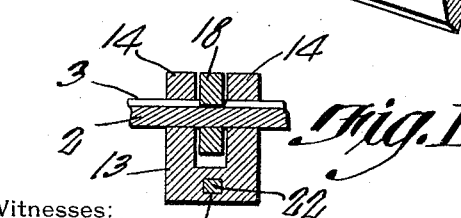
Witnesses:
W. H. Hall and
F. A. Dupea    Inventors
by C. A. Snow & Co.
Attorneys

UNITED STATES PATENT OFFICE.

WESLEY H. HALL AND FRED A. DUPEA, OF TACOMA, WASHINGTON.

CANDY-CUTTING MACHINE.

1,072,848.     Specification of Letters Patent.     Patented Sept. 9, 1913.

Application filed December 20, 1912. Serial No. 737,910.

*To all whom it may concern:*

Be it known that we, WESLEY H. HALL and FRED A. DUPEA, citizens of the United States, residing at Tacoma, in the county of Pierce, State of Washington, have invented a new and useful Candy-Cutting Machine, of which the following is a specification.

This invention relates to machines for cutting candy, the same being particularly designed for severing bars or long sticks of candy into sections of equal length, it being possible to produce a large number of uniform sections in one operation.

Another object is to provide a machine of this character the parts of which can be quickly adjusted to produce sections of any desired lengths.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings: Figure 1 is a plan view of a portion of a machine having the present improvements combined therewith. Fig. 2 is a side elevation of the actuating lever and adjacent parts, the movable blades being shown in their lowermost positions. Fig. 3 is a section on line A—B Fig. 1. Fig. 4 is an enlarged section on line C—D Fig. 1. Fig. 5 is an enlarged section on line E—F Fig. 1, the position of a bar of candy being indicated by dotted lines. Fig. 6 is an enlarged plan view of the gage rod. Fig. 7 is an enlarged plan view of a portion of the rock shaft. Fig. 8 is an end elevation of said shaft. Fig. 9 is a perspective view of a portion of one of the movable knives. Fig. 10 is a perspective view of one end portion of a fixed knife. Fig. 11 is an enlarged transverse section through one of the brackets and adjacent parts, said section being taken on the line G—H Fig. 1.

Referring to the figures by characters of reference 1 designates a portion of a table and arranged longitudinally thereon is a rock shaft 2 provided with a longitudinal keyway 3 which extends practically throughout the length thereof. As shown in the drawings this shaft bears at one end in a suitable support or bracket 4 and it is to be understood that the other end of the shaft is to be similarly mounted so that the shaft is free to rotate relative to the table 1. One end of the shaft 2 is preferably formed with an angular projection 5 and this projection is adapted to be engaged by one end portion of an arm 6. A stud 7 extends laterally from the free end of the arm and is slidably mounted within a slot 8 which extends longitudinally within an actuating lever 9. This lever is fulcrumed, as at 10, within a bracket 11 secured to one end of the table. Lever 9 is preferably formed with a handle, as shown at 12 so that the same can be readily actuated. Obviously, by pressing handle 12 downwardly, arm 6 will be swung so as to cause the shaft 2 to rotate in one direction. When, however, the handle 12 is pulled upwardly, the movement of shaft 2 will be reversed.

A series of brackets 13 is mounted on the table 1, each bracket including a pair of upstanding ears 14 at one end and in which shaft 2 is mounted to rotate freely. The other end portion of each bracket is formed with an eye 15 and it is to be understood that the eyes of all of the brackets are disposed in alinement and that the ears 14 of the brackets likewise aline. A gage rod 16 extends through the alining eyes 15 and is graduated preferably to indicate inches and fractions thereof. Set screws 17 project into the eyes 15 and are adapted to engage the rod 16 so as thus to hold the brackets against movement relative to each other.

Interposed between the ears 14 of each pair is an eye 18 formed at one end of an elongated knife 19, there being a key 20 arranged within each eye and adapted to slide within the keyway 3 formed in shaft 2. The length of this key 20 is equal to the length of eye 18 and it will thus be seen that while shaft 2 is free to rotate within the ears 14, the eyes 18 will move with the shaft and thus cause the blades 19 to swing upwardly or downwardly therewith. However, as the key 20 is mounted to slide within the keyway 3, it will be apparent that the various brackets 13 can be adjusted toward or from each other simply by loosening the set screws so as to permit the eyes 15 to slide upon the gage rod.

Each bracket 13 has an angular socket 21 extending into that end thereof from which the ears 14 project and each bracket is adapted to receive the angular end 22 of a stationary knife 23. This knife bears downwardly on the table 1 and is of a length equal to or slightly greater than the knives 19. This knife 23 has an upper cutting edge disposed close to the path of the cutting edge of the adjacent knife.

An arm 24 extends from each eye 18 and is connected, by means of a spring 25, to the adjacent bracket 13. Thus it will be seen that the knives 19 are held normally elevated by the springs. A flange 26 is extended along one side of the table and, when it is desired to cut a bar of candy into predetermined lengths, the brackets 13 are adjusted relative to each other so that the knives 19 are brought to the desired distances apart. As the knives 19 are normally raised, it will be seen that a bar of candy can be inserted under them and with its ends bearing against flange 26. After the bar has thus been positioned, handle 12 can be pushed downwardly and will cause arm 6 to rotate shaft 2. As blades 19 move with the shaft, it will be seen that these blades swing downwardly onto the candy which is resting on the fixed blade 23 and the candy will thus be severed into sections of the desired lengths.

Importance is attached to the fact that the cutting mechanism is arranged in units, each unit including a stationary blade and a movable blade, both blades being carried by an adjustable bracket and the movable blades of all of the units being mounted on and adapted to be actuated by the common shaft 2.

What is claimed is:—

1. A plurality of units each including a stationary knife and a movable knife, an actuating element for moving all of the movable knives in unison, a gage, and means carried by all of the units for adjustably engaging said gage.

2. A plurality of units each including a bracket, a stationary knife extending from the bracket, a movable knife carried by the bracket and coöperating with the stationary knife, yielding means for holding the movable knife normally spaced from the stationary knife, means common to all of the units for actuating the movable knives in unison toward the stationary knives, and graduated means for adjustably connecting the units.

3. The combination with a table, an actuating shaft, and a gage rod parallel with the shaft, of brackets supported on the table and connected to and separately adjustable longitudinally of the gage rod, said shaft being journaled within the brackets, stationary knives extending from the brackets and bearing on the table, and movable knives feathered on the shaft and adjustable with the brackets.

4. The combination with a table, a revoluble shaft, and a gage rod, of brackets slidable upon the shaft and gage rod, means coöperating with the gage rod for holding the brackets against movement relative to each other, stationary blades extending from the brackets and bearing on the table, and movable blades feathered on the shaft and adjustable with the brackets.

5. The combination with a shaft and a gage rod, of brackets separately adjustable along the shaft and gage rod, means coöperating with the gage rod for holding the brackets against relative movement, a stationary blade extending from each bracket, and a movable blade extending from each bracket and feathered upon the shaft.

In testimony that we claim the foregoing as our own, we have hereto affixed our signatures in the presence of two witnesses.

WESLEY H. HALL.
FRED A. DUPEA.

Witnesses:
H. G. FITCH,
W. C. WEDDER.

---

Copies of this patent may be obtained for five cents each, by addressing the "Commissioner of Patents, Washington, D. C."